United States Patent
Kim

(10) Patent No.: US 9,711,802 B2
(45) Date of Patent: Jul. 18, 2017

(54) PREPARING METHOD OF ALLOY CATALYST USING POLYDOPAMINE COATING AND ALLOY CATALYST THEREBY

(71) Applicant: INDUSTRY-ACADEMIC COOPERATION FOUNDATION, YONSEI UNIVERSITY, Seoul (KR)

(72) Inventor: Hansung Kim, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 402 days.

(21) Appl. No.: 14/579,841

(22) Filed: Dec. 22, 2014

(65) Prior Publication Data

US 2015/0255802 A1    Sep. 10, 2015

(30) Foreign Application Priority Data

Mar. 10, 2014    (KR) ........................ 10-2014-0027664

(51) Int. Cl.
  *H01M 4/92*    (2006.01)
  *H01M 4/86*    (2006.01)
  *H01M 4/88*    (2006.01)

(52) U.S. Cl.
  CPC ......... *H01M 4/926* (2013.01); *H01M 4/8663* (2013.01); *H01M 4/8882* (2013.01); *H01M 4/8892* (2013.01); *H01M 4/921* (2013.01)

(58) Field of Classification Search
  CPC ............. H01M 4/8663; H01M 4/8882; H01M 4/8892; H01M 4/921; H01M 4/926
  (Continued)

(56) References Cited

FOREIGN PATENT DOCUMENTS

KR    1020120057432    6/2012

OTHER PUBLICATIONS

Hu et al. Modification of carbon nanotubes with a nanothin polydopamine layer and polydimethylamino-ethyl methacrylate brushes. Carbon, vol. 48, 2010, pp. 2347-2353 [online], [retrieved on Mar. 7, 2017]. Retrieved from the Internet ,URL: http://www.sciencedirect.com/science/article/pii/S0008622310001788>.*

(Continued)

*Primary Examiner* — Basia Ridley
*Assistant Examiner* — James Erwin
(74) *Attorney, Agent, or Firm* — Duane Morris LLP; J. Rodman Steele, Jr.; Gregory M. Lefkowitz

(57) ABSTRACT

Provided is a method for preparing an alloy catalyst for fuel cells having excellent catalytic activity and high durability. The method includes coating a platinum or platinum-transition metal catalyst supported on carbon with polydopamine as a capping agent. The method for preparing an alloy catalyst supported on carbon uses polydopamine as a capping agent for a platinum or platinum-transition metal catalyst supported on carbon, and thus provides a binary or ternary platinum alloy catalyst supported on carbon having a small particle size and high alloying degree despite the subsequent high-temperature heat treatment. In addition, polydopamine (PDA) is a highly adhesive material and allows thin and uniform coating, and thus inhibits particle size growth during heat treatment while allowing easy diffusion of a transition metal into the metal. As a result, it is possible to provide an alloy catalyst provided with a core-shell structure having a surface layer formed of platinum alone and showing a high alloying degree. Finally, it is possible to provide an alloy catalyst having excellent catalytic activity and durability. Further, since polydopamine (PDA) is capable of self-polymerization at room tempera- (Continued)

ture, PDA coating is carried out without additional reagents or equipment. Thus, the method has high processability and cost-efficiency.

18 Claims, 7 Drawing Sheets

(58) Field of Classification Search
USPC .......................................................... 429/524
See application file for complete search history.

(56) References Cited

OTHER PUBLICATIONS

Su, Fabing, et al., "Pt nanoparticles supported on mesoporous carbon nanocomposites Incorported with Ni or Co nanoparticles for fuel cells," Journal of Power Sources, 2012, pp. 136-144.

Li, Wenzhen, et al., "Nano-structured Pt-Fe/C as cathode catalyst in direct methanol fuel cell," Electrochimica Acta, 2004, vol. 49, pp. 1045-1055.

Xiong, Liufeng, et al., "Syntheses and characterization of carbon supported PtW catalysts from carbonyl complexes for oxygen electroreduction," Electrochmistry Communications, 2006, vol. 8, pp. 1671-1676.

* cited by examiner

PREPARING METHOD OF ALLOY CATALYST USING POLYDOPAMINE COATING AND ALLOY CATALYST THEREBY

CROSS-REFERENCE TO RELATED APPLICATIONS

This application claims priority under 35 U.S.C. §119 to Korean Patent Application No. 10-2014-0027664 filed on Mar. 10, 2014 in the Korean Intellectual Property Office, the disclosure of which is incorporated herein by reference in its entirety.

TECHNICAL FIELD

The following disclosure relates to a method for preparing an alloy catalyst for fuel cells. More particularly, the following disclosure relates to a method for preparing an alloy catalyst for fuel cells having excellent catalytic activity and high durability through the inhibition of particle size growth and a high alloying degree by coating a platinum or platinum-transition metal catalyst supported on carbon with polydopamine as a capping agent, followed by heat treatment.

BACKGROUND

The catalysts used most frequently in oxygen reduction reaction in a fuel cell are largely formed by platinum (Pt)-based noble metals. Such platinum catalysts are produced in a very small amount all over the world, and thus are highly expensive. Due to the problem of such high price of platinum, commercialization of fuel cells are delayed. To solve such a problem, active studies have been conducted recently about platinum alloy catalysts in order to reduce the use of platinum. In the case of a platinum alloy catalyst, metals other than platinum are used in a predetermined ratio and the amount of platinum may be reduced, resulting in a decrease in price of such a catalyst. In addition, such alloying causes a change in atomic structure, resulting in an increase in activity.

As an alloy catalyst for fuel cells, active studies have been conducted about PtM including platinum alloyed with a transition metal (M=Ni, Co, Fe, Cr, V, Ti) and having a face-centered cubic lattice structure. In general, a platinum catalyst supported on carbon is obtained by a precursor deposition process in which a metal precursor is deposited on a platinum catalyst supported on carbon, followed by heat treatment. After a metal precursor is deposited on a platinum catalyst supported on carbon, heat treatment is carried out at 700-1200° C. while a gaseous reducing agent such as hydrogen is allowed to flow therethrough, thereby providing a platinum alloy catalyst. Although such heat treatment carried out at high temperature increases the alloying degree of a catalyst and catalytic activity, it causes an increase in platinum particle size and agglomeration of particles, resulting in a decrease in catalytically active area.

Therefore, more recently, some studies have been conducted about production of a platinum alloy catalyst supported on carbon without heat treatment at high temperature. Xiong and coworkers prepared a platinum alloy catalyst using a carbonyl complex process (Electrochemistry communications, 10 (2006) 1671-1676), while Santos and coworkers prepared a Pt—Ni alloy catalyst by a microemulsion process using a surfactant. In addition, Li and coworkers prepared a Pt—Fe alloy catalyst by using a polyol process (Electrochimica Acta 49 (2004) 1045-1055). Further, Su and coworkers prepared an alloy catalyst at 400° C. using a hydrogen reduction reaction (Journal of Power Sources 205, (2012) 136-144). The above-mentioned processes successfully inhibited particle size growth after alloying. However, they have problems in that it is difficult to control the ratio of metals for use in alloying and they provide a low alloying degree. In addition, a platinum alloy catalyst having a low alloying degree has a large amount of transition metals present on the surface thereof. Such transition metals present on the surface easily dissolved out in the acidic environment of a fuel cell, thereby causing degradation of the durability of a fuel cell.

Therefore, there is a need for forming a layer having a high alloying degree, i.e., high platinum density, so-called a Pt skin in a platinum alloy catalyst supported on carbon, as well as for a method for inhibiting particle size growth while carrying out heat treatment at high temperature.

To solve the above problems, the inventors of the present disclosure have developed a method for inhibiting the growth of a platinum alloy catalyst during high-temperature heat treatment by introducing polypyrrole (Ppy) as a capping agent (Korean Patent Publication No. 10-1231006). Although the method inhibited the growth of platinum alloy catalyst particles despite high-temperature heat treatment, it has a disadvantage in that additional equipment is required because of Ppy coating carried out at a low temperature of 4° C. Moreover, due to the large thickness of a Ppy coating layer, transition metal particles such as Ni or Co diffuse slowly into platinum particles during heat treatment, and the method cannot provide a perfect core-shell structure and has a limitation in alloying degree.

SUMMARY

An embodiment of the present disclosure is directed to providing a method for preparing an alloy catalyst capable of solving the above-mentioned problems, and more particularly to providing a method for preparing an alloy catalyst capable of inhibiting the growth of catalyst particle size during heat treatment while realizing a high alloying degree.

In one aspect, there is provided a method for preparing an alloy catalyst supported on carbon, including the following steps of:
(a) coating the surface of a platinum catalyst supported on carbon or platinum-transition metal catalyst supported on carbon with polydopamine;
(b) allowing the polydopamine-coated platinum catalyst supported on carbon to be impregnated with a transition metal salt; and
(c) heat treating the transition metal salt-impregnated polydopamine-coated platinum catalyst supported on carbon.

According to an embodiment, the carbon may be at least one selected from the group consisting of carbon black, carbon nanotubes, carbon nanofibers, carbon nanocoils and carbon nanocages.

According to another embodiment, the platinum-transition metal may include platinum and at least one selected from the group consisting of gold, silver, cobalt, iron, nickel, palladium, ruthenium, titanium, vanadium and chrome.

According to still another embodiment, the transition metal salt may be at least one selected from the group consisting of nitrates, sulfates, acetates, chlorides and oxides containing gold, silver, cobalt, iron, nickel, palladium, ruthenium, titanium, vanadium or chrome.

According to still another embodiment, the heat treatment may be carried out at 700-1000° C.

According to yet another embodiment, the polydopamine may be coated with a thickness of 0.5-5.0 nm.

In another aspect, there is provided an alloy catalyst supported on carbon obtained by the above-defined method, and provided with a core-shell structure having a surface layer including platinum and a core including platinum and the transition metal.

In still another aspect, there are provided an electrode for fuel cells and a fuel cell including the alloy catalyst supported on carbon.

The above-mentioned method for preparing an alloy catalyst supported on carbon uses polydopamine as a capping agent for a platinum or platinum-transition metal catalyst supported on carbon, and thus provides a binary or ternary platinum alloy catalyst supported on carbon having a small particle size and a high alloying degree despite the subsequent high-temperature heat treatment.

In addition, polydopamine (PDA) is a highly adhesive material and allows thin and uniform coating, and thus inhibits particle size growth during heat treatment while allowing easy diffusion of a transition metal into the metal. As a result, it is possible to provide an alloy catalyst provided with a core-shell structure having a surface layer formed of platinum alone and showing a high alloying degree. Finally, it is possible to provide an alloy catalyst having excellent catalytic activity and durability.

Further, since polydopamine (PDA) is capable of self-polymerization at room temperature, PDA coating is carried out without additional reagents or equipment. Thus, the method disclosed herein has high processability and cost-efficiency.

DETAILED DESCRIPTION OF EMBODIMENTS

Figure 1:
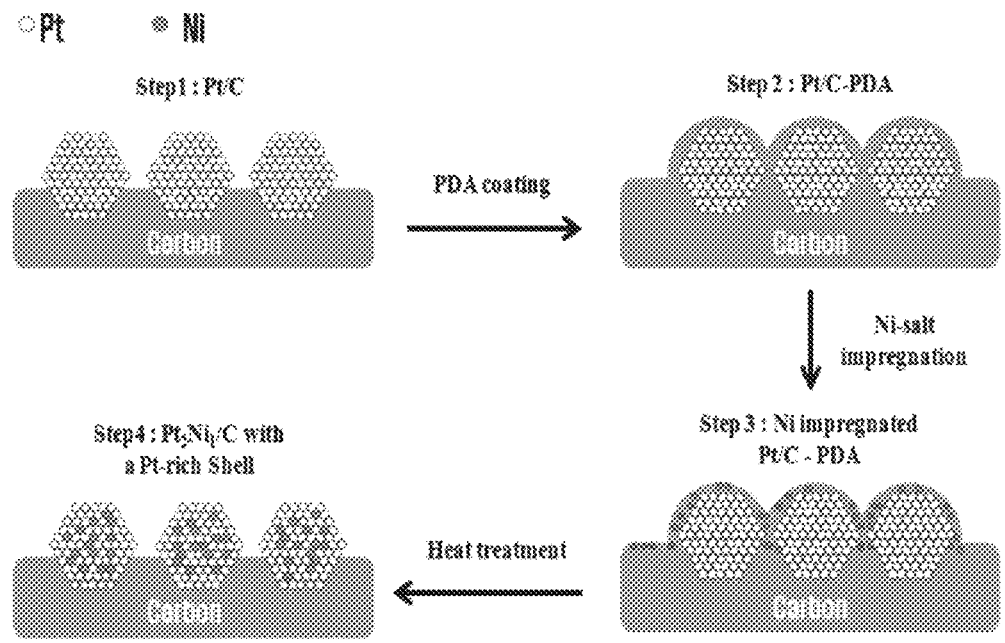
FIG. 1 is a schematic view Illustrating the method for preparing a binary platinum alloy catalyst supported on carbon according to an embodiment, wherein polydopamine (PDA) is applied to the platinum catalyst supported on carbon as a capping agent, and the binary platinum alloy catalyst supported on carbon is obtained by a precursor deposition process.

Hereinafter, the present disclosure will be described in detail with reference to the accompanying drawings.

A polymer electrolyte fuel cell (PEMFC) may be applied to cars or portable electronic devices as a substitute for a chargeable battery. In addition, it has advantages in that it is operated at a relatively low temperature and is driven rapidly even in a cold region, and has high output density by which downsizing is allowed. However, there are some technical problems to be overcome in order to commercialize polymer electrolyte fuel cells. Particularly, the catalyst of a polymer electrolyte fuel cell based on a highly expensive platinum catalyst is the main cause of an increase in cost of fuel cell systems. Therefore, in order to enhance the activity of a catalyst while reducing the use of platinum, catalysts such as PtM/C (M=Ni, Co, Fe, Cu) obtained by forming a platinum alloy catalyst and supporting the catalyst on carbon have been studied alternatively. However, due to some technical problems, such platinum alloy catalysts have not yet been used in fuel cells.

When preparing a platinum alloy catalyst through a solution reduction reaction, easily reducible platinum is produced first and then a transition metal is reduced, and thus the surface of the resultant alloy catalyst has a high concentration of transition metal. When using such a catalyst in a fuel cell, the transition metal distributed on the surface of alloy is dissolved out due to the acidic environment of a fuel cell, resulting in degradation of the performance of fuel cell. Therefore, heat treatment is carried out at a high temperature of 700° C. or more in order to further increase the concentration of platinum on the surface. Such high-temperature heat treatment causes platinum having higher density to move toward the surface, thereby forming a Pt skin. However, such high-temperature heat treatment causes agglomeration of platinum alloy particles with a size of several nanometers. As a result, the catalyst has a decreased active surface area, resulting in degradation of the performance of a fuel cell. Therefore, in order to solve the above-mentioned problems, there is a need for inhibiting the size of platinum alloy particles even during high-temperature heat treatment.

According to an embodiment, polydopamine (PDA) having easy coatability to any surfaces and high adhesion and represented by the following Chemical Formula is used as a protective capping agent inhibiting particle growth. Thus, there is provided a method for preparing a platinum alloy catalyst that inhibits particle size growth during heat treatment and is provided with a core-shell structure having a Pt skin formed of platinum alone. There is also provided a platinum alloy catalyst obtained by the above-mentioned method and having high catalytic activity and high durability.

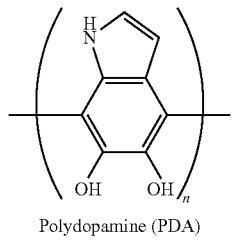

Polydopamine (PDA)

Dopamine is a small molecule substance including catechol and amine functional groups and having adhesive property. Dopamine is characterized in that it is coated onto the surface of any material through self-polymerization under a weak basic (pH 8.5) condition without additional reagents.

The method for preparing an alloy catalyst supported on carbon disclosed herein includes the steps of coating a platinum or platinum-transition metal catalyst supported on carbon with polydopamine as a capping agent, impregnating the transition metal salt within the resultant PDA layer, and carrying out heat treatment at high temperature. Thus, an alloy catalyst capable of inhibiting the growth of catalyst particle size and having a high alloying degree is provided by virtue of the PDA layer coated uniformly with a small thickness during such heat treatment at high temperature.

In addition, the alloy catalyst supported on carbon obtained according to an embodiment is provided with a core-shell structure having a platinum surface shell layer formed of platinum alone on the surface thereof and a core formed of a transition metal. Thus, the alloy catalyst disclosed herein has high catalytic activity and high durability.

In other words, it is possible to inhibit the growth of catalyst particle size during heat treatment and to provide a catalyst having a high alloying degree by using polydopamine as a capping agent. Polydopamine is thermally decomposed during heat treatment at high-temperature and inhibits catalyst particle growth caused by high temperature. In addition, polydopamine formed on the platinum catalyst surface through self-polymerization functions like sponge in which a transition metal to be alloyed further with platinum or platinum-transition metal is held, and thus facilitates the preparation of a catalyst having a desired metal alloying ratio.

Further, polydopamine is coated through self-polymerization at room temperature, and thus requires no additional means for maintaining low temperature, unlike the conventional method using a conductive polymer as a capping agent. Since polydopamine has strong adhesion like sponge, it can be coated on the platinum catalyst supported on carbon even with a coating layer having a smaller thickness as compared to the conventional conductive polymer material, and facilitates impregnation of a transition metal precursor.

More particularly, the method for preparing an alloy catalyst supported on carbon according to an embodiment includes the following steps and the schematic view thereof is shown in FIG. 1:

(a) coating the surface of a platinum catalyst supported on carbon or platinum-transition metal catalyst supported on carbon with polydopamine as a capping agent;

(b) impregnating a transition metal complex within the polydopamine coating layer; and (c) carrying out heat treatment at high temperature under mixed gas atmosphere of hydrogen with inert gas.

Prior to step (a), the platinum catalyst supported on carbon or platinum-transition metal catalyst supported on carbon may be obtained by any known processes such as a chemical reduction process using a reducing agent or a process using an alcohol or polyol.

In step (a), the platinum (platinum-transition metal) catalyst supported on carbon is introduced into Tris-buffer solution and agitated sufficiently. After the agitation, an adequate amount of dopamine monomer is introduced to the solution and agitated sufficiently at room temperature to carry out coating of the catalyst surface with polydopamine.

In step (b), the polydopamine-coated catalyst supported on carbon is impregnated with a complex containing a transition metal salt.

In step (c), after impregnating the polydopamine layer of the polydopamine-coated catalyst supported on carbon with the transition metal salt, heat treatment is carried out in a furnace at 700-1000° C. in the presence of a mixed gas of argon with hydrogen.

During the heat treatment step at high temperature, polydopamine is decomposed and eliminated, and the transition metal diffuses into the platinum catalyst, and thus it is possible to obtain an alloy catalyst provided with a core-shell structure having a platinum surface shell layer formed of platinum alone and a core formed of the transition metal that diffuses into the inner part. Such an alloy catalyst provided with a core-shell structure prevents the transition metal from being dissolved out in the environment of a fuel cell.

In addition, since the polydopamine coating is formed uniformly with a small thickness of about 0.5-5.0 nm, the transition metal diffuses rapidly during the heat treatment to provide a high alloying degree, and the particle size growth of a metal catalyst at high temperature is inhibited effectively.

The carbon may be at least one selected from the group consisting of carbon black, carbon nanotubes, carbon nanofibers, carbon nanocoils and carbon nanocages.

The platinum-transition metal may include platinum and at least one selected from the group consisting of gold, silver, cobalt, iron, nickel, palladium, ruthenium, titanium, vanadium and chrome.

The transition metal salt may be at least one selected from the group consisting of nitrates, sulfates, acetates, chlorides and oxides containing gold, silver, cobalt, iron, nickel, palladium, ruthenium, titanium, vanadium or chrome.

EXAMPLES

The examples and experiments will now be described. The following examples and experiments are for illustrative purposes only and not intended to limit the scope of this disclosure.

Example 1

(1) First, 50 mg of 1-pyrene carboxylic acid (1-PCA) is introduced to 20 mL of ethanol and agitated for 30 minutes. After the lapse of 30 minutes, 100 mg of carbon nanocages (CNC) are introduced into 1-PCA solution and agitated for 2 hours. After the completion of agitation, the sample is filtered by a reduced-pressure filtration system to obtain CNC carbon doped with 1-PCA (Korean Patent Publication No. 10-1135578).

This step leads to formation of π-π interaction between 1-PCA and CNC, resulting in conversion of the surface of CNC into a hydrophilic surface that facilitates supporting platinum on CNC.

Next, 110 mg of CNC doped with 1-PCA is introduced to 25 mL of ethylene glycol and agitated for about 10 minutes. After the completion of agitation, 150 mg of $PtCl_4$ is introduced to the solution and further agitated for 15 minutes. After the completion of agitation, 75 mg of NaOH is introduced, and further agitated for 15 minutes.

Herein, NaOH contributes to a decrease in platinum particle size by adjusting pH of ethylene glycol. After dissolving NaOH completely, the resultant solution is subjected to reflux by using microwaves at 160° C. for 10 minutes. At that time, platinum ions are reduced and adsorbed onto the surface of CNC. To increase the supporting ratio, agitation is carried out at room temperature for 12 hours, and pH is reduced to 2, followed by agitation for 24 hours. After the completion of agitation, the solution is filtered by using a reduced-pressure filtration system. Then, the resultant product is washed with ultrapure water three times and dried at 160° C. to remove impurities, thereby providing a platinum catalyst supported on carbon.

(2) To carry out synthesis of dopamine, Tris-buffer with pH 8.5 is prepared and pH is adjusted precisely to accomplish homogeneous synthesis of dopamine. To 100 mL of deionized water, 121 mg of trisaminomethane is introduced and agitation is carried out for 1 hour. After the completion of agitation, 0.5M HCl is added in an amount of 0.2 mL by using a micropipette. During this, pH is measured every time 0.2 mL of 0.5M HCl is introduced. When pH reaches 8.5, pH down is stopped. After completing pH down, the solution is agitated for 2 hours.

(3) 38 mL of Tris-buffer solution obtained as described above is set to 25° C. and 175 mg of the above platinum catalyst supported on carbon is introduced thereto. The solution is agitated for 30 minutes, and a solution containing 80 mg of dopamine hydrochloride dissolved in 2 mL of Tris-buffer is introduced thereto, followed by agitation for 24 hours. This step leads to coating of the platinum catalyst supported on carbon with dopamine.

After the coating, the sample is recovered by using a reduced-pressure filtration system and washed twice with ultrapure water. Then, the resultant product is dried in an oven at 80° C. for 30 minutes to obtain a dopamine-coated platinum catalyst supported on CNC.

(4) 64 mg of nickel nitrate $(Ni(NO_3)_2 \cdot 6H_2O)$ and 66.6 mg of ethylene diamine are introduced to 20 mL of ultrapure water, the mixture is agitated sufficiently, and the above dopamine-coated platinum catalyst supported on CNC is further introduced thereto, followed by reflux at 80° C. for 3 hours. After the completion of reflux, ultrapure water is evaporated by using an evaporator and the sample is recovered.

The catalyst thus obtained is introduced into a furnace and subjected to heat treatment at 900° C. under a gaseous atmosphere containing 90% of argon and 10% of hydrogen for 1 hour. After the heat treatment, the sample is recovered and washed twice with deionized water to obtain a platinum nickel alloy catalyst supported on CNC ($Pt_2Ni_1$/CNC).

Examples 2 and 3

Polydopamine (PDA) is used as a capping agent, and a precursor deposition process and heat treatment is carried out in the same manner as Example 1 to obtain a platinum nickel alloy catalyst supported on CNC ($Pt_2Ni_1$/CNC), except that the heat treatment temperature in Example 1-(4) is changed to 800° C. (Example 2) and 1000° C. (Example 3).

Comparative Example 1

Nickel (Ni) is supported on the platinum catalyst supported on CNC while the polydopamine (PDA) coating step described in Examples 1-(2) and 1-(3) is omitted. Then, heat treatment is carried out at 900° C. under the atmosphere of 10% hydrogen and 90% of argon for 1 hour in the same manner as Example 1 to obtain a platinum nickel alloy catalyst supported on CNC ($Pt_2Ni_1$/CNC).

Comparative Example 2

A platinum nickel alloy catalyst supported on CNC ($Pt_2Ni_1$/CNC) is obtained by using a room temperature $NaBH_4$ reduction process.

Comparative Example 3

A platinum nickel alloy catalyst supported on CNC ($Pt_2Ni_1$/CNC) is obtained by using a room temperature $NaBH_4$ reduction process, followed by heat treatment at 900° C.

Comparative Example 4

Polypyrrole is supported on the platinum catalyst supported on CNC, while the polydopamine (PDA) coating step described in Examples 1-(2) and 1-(3) is omitted. Then, a platinum nickel alloy catalyst supported on CNC ($Pt_2Ni_1$/CNC) Is obtained in the same manner as Example 1. The step of coating polypyrrole as a capping agent is described in detail in Korean Patent Publication No. 10-1231006, and description thereof is as follows.

The platinum catalyst supported on CNC is introduced to 20 mL of ethanol, followed by agitation. Next, 130 mg of pyrrole is introduced thereto and agitated at 4° C. for 1 hour. Then, 228 mg of ammonium persulfate used as an oxidizing agent is dissolved into 100 mL of water to obtain aqueous solution, and 17.6 mL of aqueous ammonium persulfate solution is added, followed by agitation at 4° C. for 24 hours. During this step, pyrrole is polymerized into polypyrrole. After the completion of polymerization, the sample is recovered by using a reduced-pressure filtration system, washed sufficiently with water and ethanol, and dried in a vacuum oven at 40° C. for 12 hours. The sample thus recovered is a polypyrrole-coated platinum catalyst supported on CNC.

Test Example 1

Figure 2:
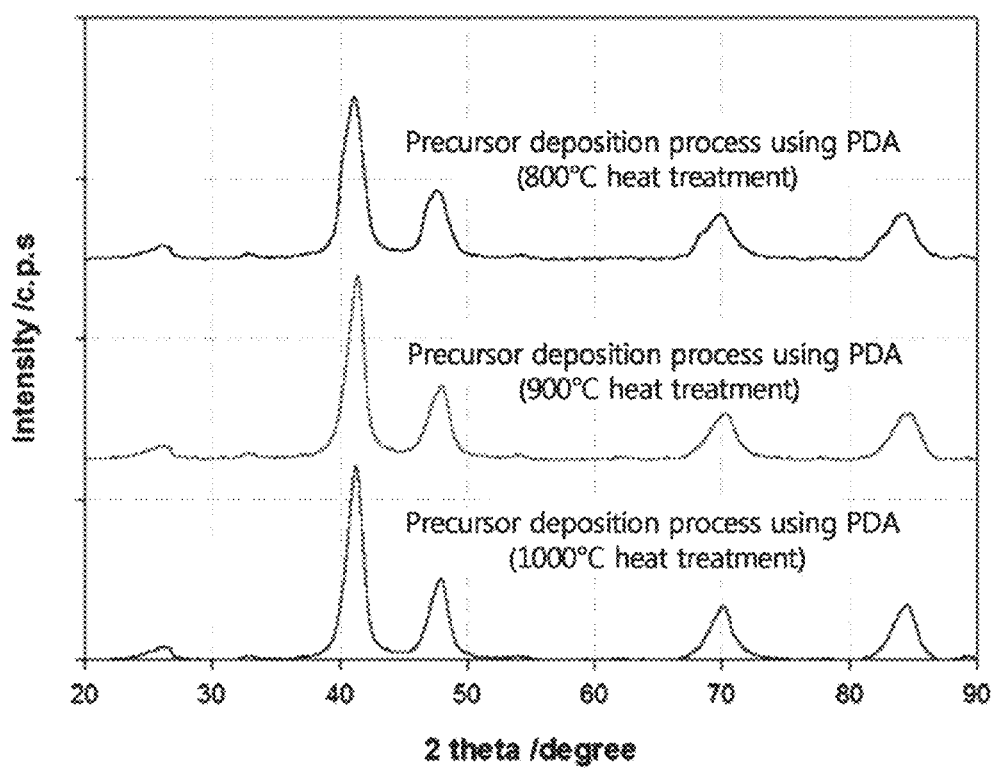
FIG. 2 shows XRD patterns of platinum nickel alloy catalysts supported on carbon nanocages (CNC) ($Pt_2Ni_1$/CNC) obtained by a precursor deposition process using polydopamine (PDA) as a capping agent according to an embodiment while varying the heat treatment to 800° C. (Example 2), 900° C. (Example 1) and 1000° C. (Example 3).

FIG. 2 shows XRD patterns of platinum nickel alloy catalysts supported on carbon nanocages (CNC) ($Pt_2Ni_1$/CNC) obtained by a precursor deposition process using polydopamine (PDA) as a capping agent according to an embodiment while varying the heat treatment to 800° C. (Example 2), 900° C. (Example 1) and 1000° C. (Example 3).

In a precursor deposition process, heat treatment temperature is one of the most important factors determining the alloying degree and particle size of a platinum alloy catalyst. In general, as the heat treatment temperature increase, the surface platinum concentration increases and the alloying degree also increases along with a decrease in the proportion of heterogeneous metals on the catalyst surface, resulting in improvement of the durability and activity of a catalyst. However, such an increase in heat treatment temperature causes an increase in catalyst particle size and particle agglomeration, leading to a decrease in active area of a catalyst.

In other words, in such a precursor deposition process, high-temperature heat treatment is essentially required to reduce the proportion of transition metals on the catalyst surface and to increase the alloying degree of a catalyst. However, although high-temperature heat treatment increases the alloying degree of a catalyst, it leads to degradation of performance caused by an increase in particle size and a decrease in dispersibility. For this, according to the present disclosure, PDA is used as a capping agent to inhibit particle size growth. Then, the optimal heat treatment temperature is determined through the XRD analysis of platinum nickel alloy catalysts ($Pt_2Ni_1$/CNC) while varying the heat treatment temperature to 1) 800° C., 2) 900° C. and 3) 1000° C.

The following Table 1 shows the alloying degree and particle sizes of $Pt_2Ni_1$/CNC catalysts depending on heat treatment temperature. The particle size of platinum is calculated by applying the peak of Pt(111) to the Scherrer Formula.

TABLE 1

| Methods for preparing $Pt_2Ni_1$/CNC | (111) peak in XRD | | ICP | | | XPS |
|---|---|---|---|---|---|---|
| | 2θ shift (°) Vs. Commercial Pt/C | Particle size (nm) | Pt (wt %) | Ni (wt %) | atomic ratio (Pt:Ni) | atomic ratio (Pt:Ni) |
| Precursor deposition using PDA 800° C. heat treatment (Ex. 2) | 1.28 | 4.1 | 43.3 | 6.2 | 2.01 | 2.14 |
| Precursor deposition using PDA 900° C. heat treatment (Ex. 1) | 1.34 | 4.2 | 43.4 | 6.4 | 1.96 | 2.84 |
| Precursor deposition using PDA 1000° C. heat treatment (Ex. 3) | 1.46 | 4.7 | 43.4 | 6.2 | 2.02 | 3.4 |

As a result, the particle size of catalyst heat-treated at 800° C. is 4.1 nm, that of catalyst heat-treated at 900° C. is 4.2 nm and that of catalyst heat-treated at 1000° C. is 4.7 nm. Thus, the particle size does not increase substantially till 900° C. but increases slightly starting from 1000° C. In addition, although the particle size slightly increases in the case of heat treatment at 1000° C., the catalyst still maintains a particle size of 5 nm or less, suggesting that the method according to the present disclosure sufficiently inhibits the growth of catalyst particle size.

The alloying degree is determined through the shift of Pt(111) peak. As the peak moves toward the right side as compared to the XRD peak of the commercially available Pt/C catalyst, the alloying degree increases. In the case of the alloying degree of catalyst heat-treated at 800° C., the catalyst shows a peak shift of 1.28° as compared to the commercially available Pt/C. The catalyst heat-treated at 900° C. shows a peak shift of 1.34° and the catalyst heat-treated at 1000° C. shows a peak shift of 1.46°. It can be seen from the above results that even when using PDA as a capping agent, a higher heat treatment temperature tends to provide a higher alloying degree.

Thus, the optimal temperature condition can be determined, since PDA coating maintains a small particle size even during high-temperature heat treatment and provides a high alloying degree but a slight increase in particle size appears starting from 1000° C. (>900° C.).

In addition, Table 1 also shows the results of XRD, ICP and XPS of platinum nickel alloy catalysts supported on CNC ($Pt_2Ni_1$/CNC) obtained by a precursor deposition process using polydopamine (PDA) as a capping agent according to an embodiment while varying the heat treatment to 800° C. (Example 2), 900° C. (Example 1) and 1000° C. (Example 3).

It can be seen from the results of ICP that all of the three catalysts satisfy the ratio of 50 wt %, Pt:Ni=2:1, and thus can provide an alloy with a desired composition according to the present disclosure.

XPS analysis is used frequently when analyzing the surface components of a material, unlike ICP analysis. After carrying out XPS, the catalyst heat-treated at 800° C. has a ratio of Pt:Ni of 2.14:1, the catalyst heat-treated at 900° C. has a ratio of Pt:Ni of 2.84:1, and the catalyst heat-treated at 1000° C. has a ratio of Pt:Ni of 3.4:1.

Considering that the ratio of bulk concentration Pt:Ni=2:1, it can be seen from the above results that as the heat treatment temperature increases, transition metal particles such as Ni diffuse into platinum and the distribution of platinum on the surface increases, while forming a core-shell structure having a Pt skin on the surface.

Since a fuel cell is operated in an acidic condition, a higher proportion of platinum on the surface of a platinum alloy catalyst provides a decreased amount of transition metals dissolved out from the catalyst, thereby enhancing durability. Therefore, a platinum alloy catalyst having a high alloying degree and a core-shell structure with a large proportion of platinum on the surface is more suitable as a catalyst for fuel cells.

Test Example 2

Figure 3:
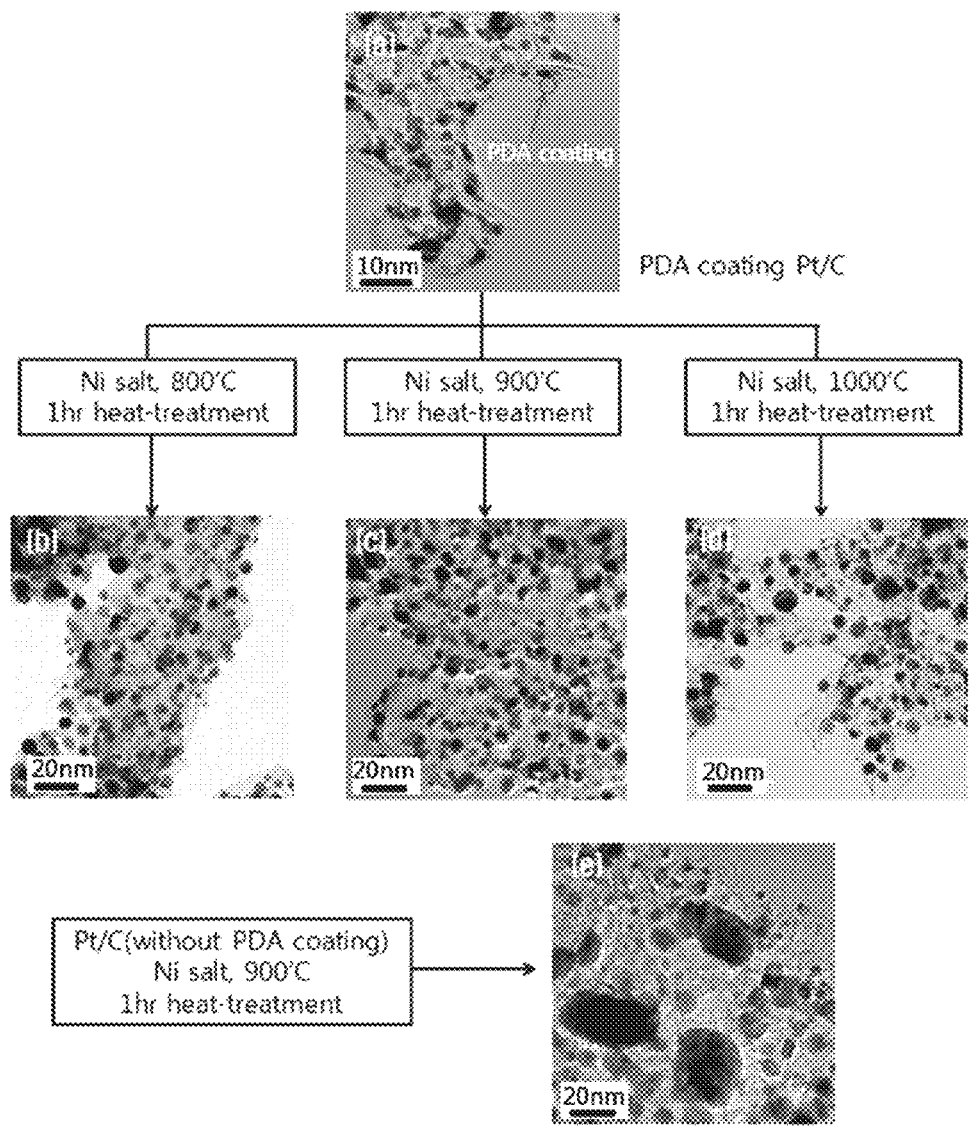
FIG. 3 shows high-resolution transmission electron microscopy (HR-TEM) images of platinum nickel alloy catalysts ($Pt_2Ni_1$/CNC) obtained by allowing the PDA-coated Pt catalyst supported on carbon nanocages (Pt/CNC) to be impregnated with a nickel salt and carrying out heat treatment at 800° C., 900° C. and 1000° C. according to Examples 1-3, and a platinum nickel alloy catalyst supported on CNC ($Pt_2Ni_1$/CNC) obtained by impregnation of Ni without PDA and carrying out heat treatment at 900° C. according to Comparative Example 1.

FIG. 3 shows high-resolution transmission electron microscopy (HR-TEM) images of platinum nickel alloy catalysts ($Pt_2Ni_1$/CNC) obtained by allowing the PDA-coated Pt catalyst supported on carbon nanocages (Pt/CNC) to be impregnated with a nickel salt and carrying out heat treatment at 800° C., 900° C. and 1000° C. according to Examples 1-3, and a platinum nickel alloy catalyst supported on CNC ($Pt_2Ni_1$/CNC) obtained by impregnation of Ni without PDA and carrying out heat treatment at 900° C. according to Comparative Example 1.

Portion (a) shows Pt/CNC coated with PDA before heat treatment, and portion (b) shows the sample (Example 2) obtained by impregnation with a nickel salt, followed by heat treatment at 800° C. under the atmosphere of 10% hydrogen with 90% argon for 1 hour. Portion (e) shows the sample (Comparative Example 1) obtained by impregnation with Ni without PDA as a capping agent, followed by heat treatment at 900° C. under the atmosphere of 10% hydrogen with 90% argon for 1 hour. Portions (c) and (d) show the samples (Examples 1 and 3) obtained by the same method except that heat treatment is carried out at 900° C. and 1000° C.

First, in portion (a), it is shown that a PDA coating layer is formed with a very small thickness of about 0.5-5.0 nm.

Next, in the case of (b), (c) and (d) obtained by Ni impregnation and high-temperature heat treatment, a higher temperature provides a larger particle size. However, all of the three samples have a small alloying particle size of 5 nm or less while maintaining high dispersibility.

On the other hand, in the case of (e) having no PDA coating shows low dispersibility of alloying particles and a very large particle size. Thus, it can be seen that PDA coating is essential for preparing a platinum alloy catalyst having small and uniform catalyst particles.

Test Example 3

Figure 4:
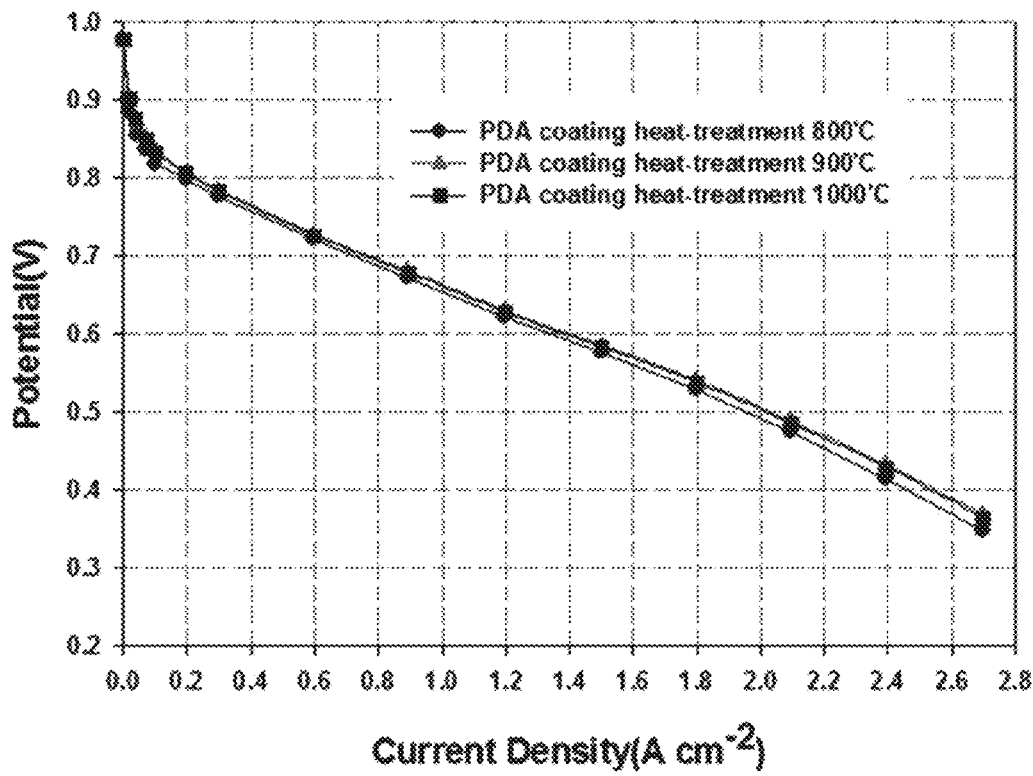
FIG. 4 shows the results of evaluation of the performance of the unit cells including platinum nickel alloy catalysts supported on CNC ($Pt_2Ni_1$/CNC) obtained by a precursor deposition process using polydopamine (PDA) as a capping agent according to an embodiment while varying the heat treatment to 800° C. (Example 2), 900° C. (Example 1) and 1000° C. (Example 3).

FIG. 4 shows the results of evaluation of the performance of the unit cells including platinum nickel alloy catalysts supported on CNC ($Pt_2Ni_1$/CNC) obtained by a precursor deposition process using polydopamine (PDA) as a capping agent according to an embodiment while varying the heat treatment to 800° C. (Example 2), 900° C. (Example 1) and 1000° C. (Example 3).

An anode is obtained by using 0.1 mg/cm$^2$ of a commercially available Pt/C catalyst based on Pt, and a cathode is obtained by using 0.1 mg/cm$^2$ of each catalyst based on metal. Each unit cell is operated at a temperature of 80° C. with a gas flow of 150 ccm of each of oxygen and hydrogen under ambient pressure. The performance of each unit cell is evaluated through the current density value at 0.6V.

In the case of the sample obtained at 800° C., current density is 1.34 A/cm$^2$ at 0.6V. In addition, the sample obtained at 900° C. shows a current density of 1.39 A/cm$^2$ at 0.6V and the sample obtained at 1000° C. shows a current density of 1.38 A/cm$^2$ at 0.6V. It is thought that such results are derived because the $Pt_2Ni_1$/CNC catalyst obtained by heat treatment at 900° C. has a high alloying degree and maintains a small particle size.

Figure 5:
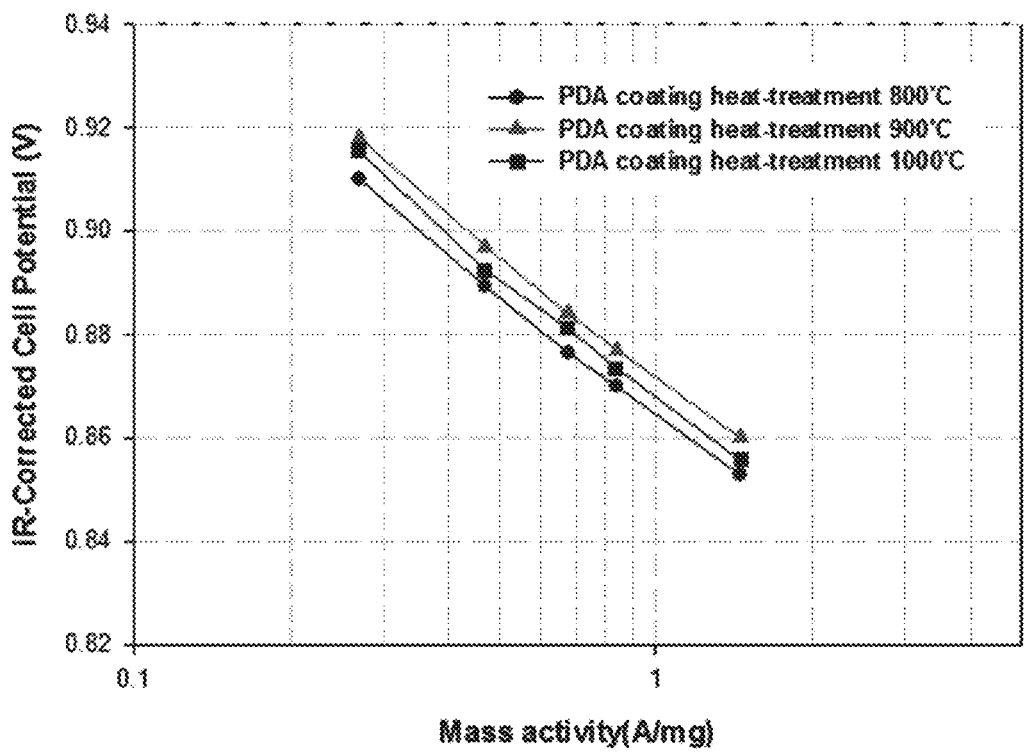
FIG. 5 shows the results of determination of the mass activities of platinum nickel alloy catalysts supported on CNC ($Pt_2Ni_1$/CNC) obtained by a precursor deposition process using polydopamine (PDA) as a capping agent according to an embodiment while varying the heat treatment to 800° C. (Example 2), 900° C. (Example 1) and 1000° C. (Example 3).

In addition, FIG. 5 shows the results of determination of the mass activities of platinum nickel alloy catalysts supported on CNC ($Pt_2Ni_1$/CNC) obtained by a precursor deposition process using polydopamine (PDA) as a capping agent according to an embodiment while varying the heat treatment to 800° C. (Example 2), 900° C. (Example 1) and 1000° C. (Example 3).

Mass activity is measured at 1.5 atm as an IR-free current value versus mass at 0.9V. In the case of the sample obtained at 800° C., mass activity is 0.36 A/mg. In addition, the sample obtained at 900° C. shows a mass activity of 0.43 A/mg and the sample obtained at 1000° C. shows a mass activity of 0.39 A/mg. It can be seen from the above results that a heat treatment temperature of 900° C. is the optimal condition for a small size of platinum alloy catalyst particles and a high alloying degree in a precursor deposition process.

Test Example 4

Figure 6:
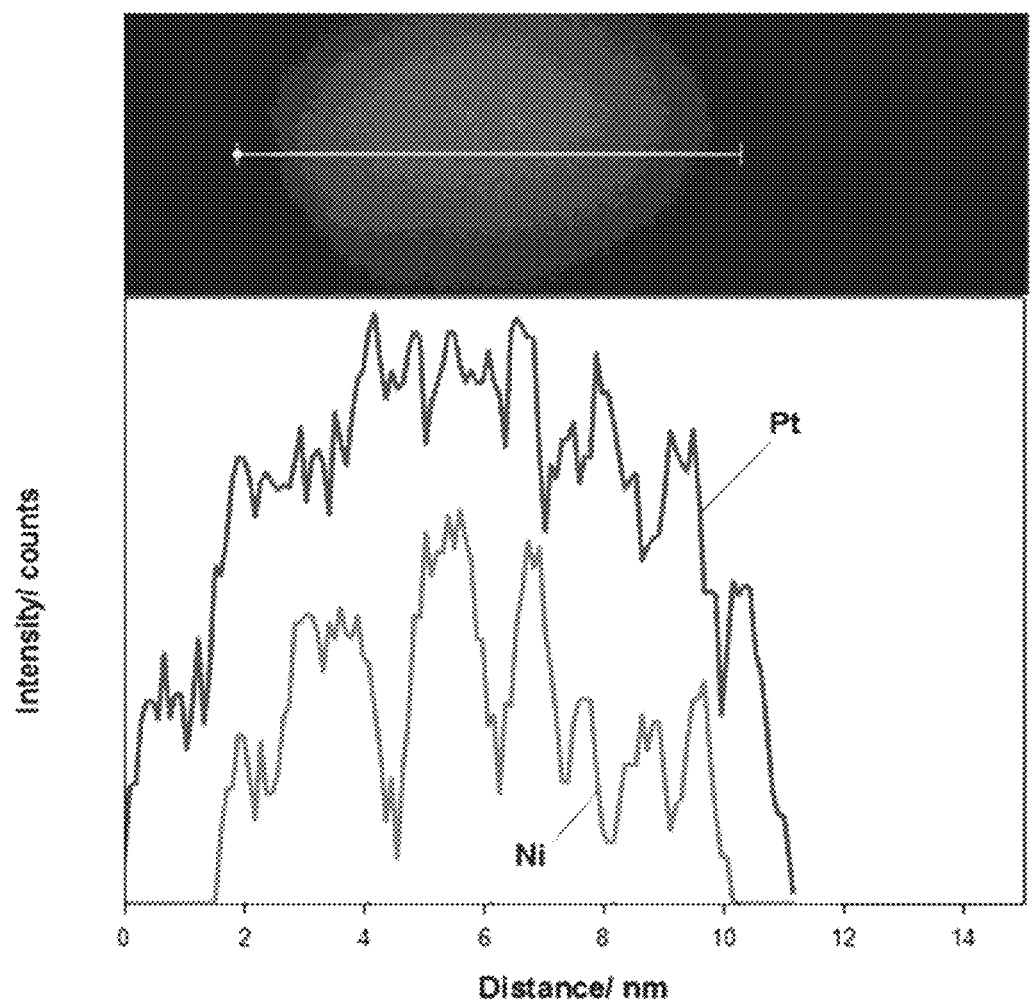
FIG. 6 shows high angle annular dark field (HAADF) images and concentration distribution profile of platinum and nickel in a platinum nickel alloy catalyst supported on CNC ($Pt_2Ni_1$/CNC) obtained by a precursor deposition process using polydopamine (PDA) as a capping agent and a heat treatment temperature of 900° C. according to an embodiment.

FIG. 6 shows high angle annular dark field (HAADF) images and concentration distribution profile of platinum and nickel in a platinum nickel alloy catalyst supported on CNC ($Pt_2Ni_1$/CNC) obtained by a precursor deposition process using polydopamine (PDA) as a capping agent and a heat treatment temperature of 900° C. according to an embodiment.

After carrying out the test, it can be seen that while Pt and Ni are distributed evenly at the center of platinum alloy catalyst particles, only Pt exists on the surface with no Ni. The above results suggests that a Pt skin in which platinum exists alone on the surface is formed during the preparation of a platinum nickel alloy ($Pt_2Ni_1$/CNC) catalyst using PDA as a capping agent, and thus an alloy catalyst having a kind of core-shell structure is obtained.

Test Example 5

Figure 7:
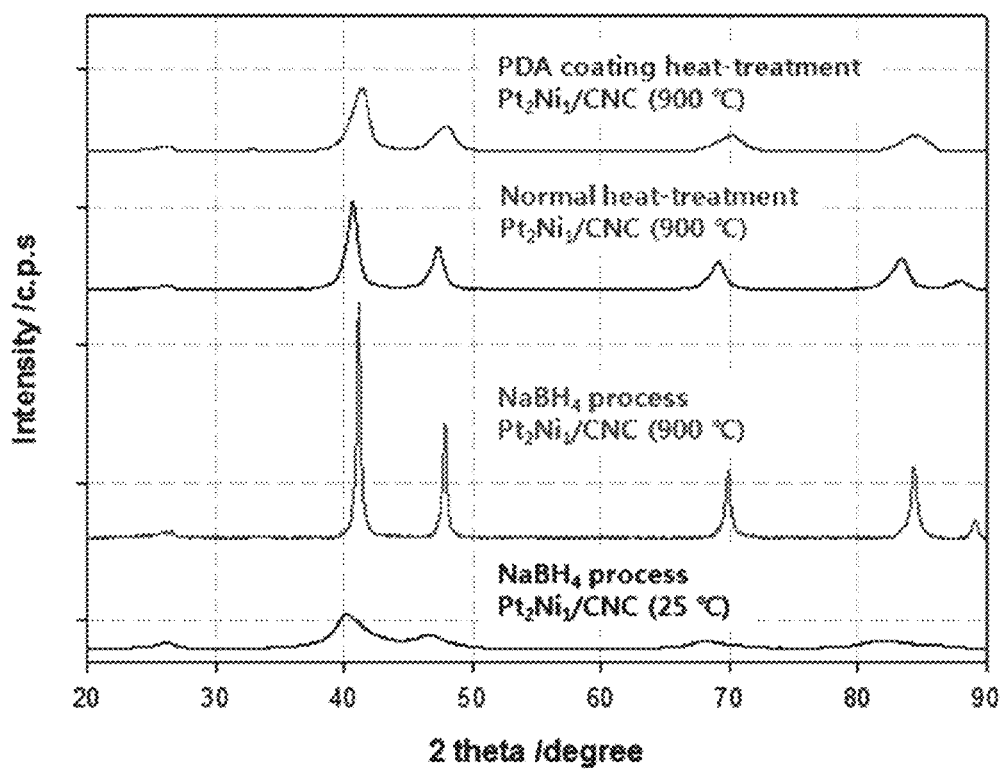
FIG. 7 shows XRD pattern images of platinum nickel alloy catalysts supported on CNC ($Pt_2Ni_1$/CNC) obtained by a room-temperature $NaBH_4$ reduction process (Comparative Example 2), $NaBH_4$ reduction process followed by a precursor deposition process using heat treatment at 900° C. (Comparative Example 3), a conventional precursor deposition process using no polydopamine (PDA) as a capping agent (Comparative Example 1), and by Example 1 according to the present disclosure.

FIG. 7 shows XRD pattern images of platinum nickel alloy catalysts supported on CNC ($Pt_2Ni_1$/CNC) obtained by a room-temperature NaBH$_4$ reduction process (Comparative Example 2), NaBH$_4$ reduction process followed by a precursor deposition process using heat treatment at 900° C. (Comparative Example 3), a conventional precursor deposition process using no polydopamine (PDA) as a capping agent (Comparative Example 1), and by Example 1.

In general, the following two types of processes are used to prepare a platinum alloy catalyst: a precursor deposition process and a process for preparing an alloy using a strong reducing agent. When using a strong reducing agent to obtain an alloy catalyst, alloying is carried out rapidly, and thus it is difficult to control the size of metal particles. Moreover, in this case, the catalyst has a large proportion of transition metals on the surface thereof. Such transition metals on the surface lead to a decreased amount of platinum on the surface, resulting in a decrease in catalytically active area. In addition, in view of durability, the acidic environment of a fuel cell causes dissolution of transition metals, resulting in degradation of the performance of a fuel cell. Therefore, although high-temperature heat treatment is required to reduce the proportion of transition metals on the surface and to increase the alloying degree, such high-temperature heat treatment causes an increase in particle size, a decrease in dispersibility and a decrease in active area. Therefore, a capping agent is required to inhibit the particle size growth during heat treatment.

According to the present disclosure, different platinum nickel alloy catalysts supported on CNC ($Pt_2Ni_1$/CNC) are prepared by using: a room temperature $NaHB_4$ reduction process; a room temperature $NaHB_4$ reduction process followed by heat treatment at 900° C.; a conventional precursor deposition process; and a precursor deposition process using polydopamine as a capping agent. Then, the catalysts are analyzed by XRD and ICP and the results are shown in the following Table 2.

TABLE 2

| Methods for preparing $Pt_2Ni_1$/CNC | (111) peak in XRD | | ICP | | |
|---|---|---|---|---|---|
| | 2θ shift(°) Vs. Commercial Pt/C | Particle size (nm) | Pt (wt %) | Ni (wt %) | atomic ratio (Pt:Ni) |
| $NaBH_4$ reduction room temperature Comp. Ex. 2 | 0.48 | 3.2 | 43.2 | 6.0 | 2.07 |
| $NaBH_4$ reduction 900° C. heat treatment Comp. Ex. 3 | 1.30 | 22.2 | 43.6 | 6.4 | 1.96 |
| Precursor deposition 900° C. heat treatment Comp. Ex. 1 | 0.90 | 8.2 | 43.2 | 6.0 | 2.07 |
| Precursor deposition using PDA 900° C. heat treatment Ex. 1 | 1.34 | 4.2 | 43.4 | 6.4 | 1.96 |

The four methods of Comparative Examples 1-3 and Example 1 satisfy an impregnation ratio of 50 wt % and bulk atomic ratio of Pt:Ni=2:1.

In FIG. 7, the Pt(111) peak at the region of 2θ=39.8° Is applied to the Scherrer formula to calculate the size of platinum particles. As a result, the CNC ($Pt_2Ni_1$/CNC) obtained by using a room temperature $NaHB_4$ reduction process has a particle size of 3.2 nm, and the CNC ($Pt_2Ni_1$/CNC) obtained by using a room temperature $NaHB_4$ reduction process followed by heat treatment at 900° C. has a significantly increased particle size of 22.2 nm.

The alloying degree is determined through the shift of Pt(111) peak. As compared to a commercially available Pt/C catalyst, the CNC ($Pt_2Ni_1$/CNC) obtained by using a room temperature $NaHB_4$ reduction process shows a shift of 0.48°, and the same catalyst subjected to further heat treatment at 900° C. shows a shift of 1.3°.

It can be seen from the above results that the $NaHB_4$ reduction process provides an alloy catalyst having a small particle size but has a disadvantage of low alloying degree. In addition, when carrying out heat treatment at high temperature to increase the alloying degree, there is a problem of an increase in particle size. In the case of a precursor deposition process using heat treatment at 900° C., $Pt_2Ni_1$/CNC has a particle size of 8.2 nm, which is smaller as compared to $Pt_2Ni_1$/CNC obtained by room temperature $NaHB_4$ reduction process followed by heat treatment at 900° C. However, considering the alloying degree, there is a shift of Pt peak of 0.90°, which is lower as compared to $Pt_2Ni_1$/CNC obtained by room temperature $NaHB_4$ reduction process followed by heat treatment at 900° C. In addition, $Pt_2Ni_1$/CNC obtained by a precursor deposition process using polydopamine as a capping agent has a small particle size of 4.2 nm and shows a shift of Pt peak of 1.34°, and thus has a high alloying degree and small particle size.

As a result, the precursor deposition process using PDA as a capping agent according to the present disclosure provides an increased alloying degree while maintaining a small particle size, which is the best in preparing a catalyst for fuel cells.

Test Example 6

Figure 8:
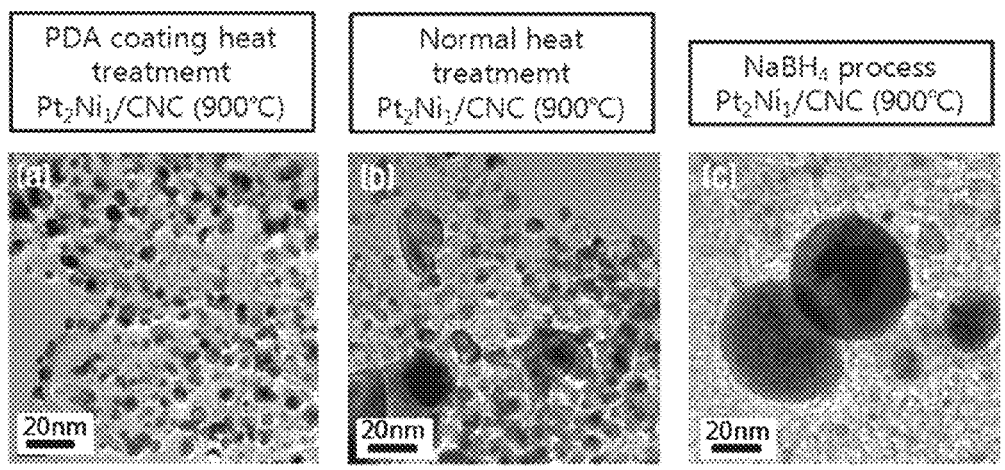
FIG. 8 shows HR-TEM images of platinum nickel alloy catalysts supported on CNC ($Pt_2Ni_1$/CNC) obtained by a $NaBH_4$ reduction process followed by heat treatment at 900° C. (Comparative Example 3), a conventional precursor deposition process followed by heat treatment at 900° C. (Comparative Example 1), and by a precursor deposition process using polydopamine (PDA) as a capping agent followed by heat treatment at 900° C. (Example 1).

FIG. 8 shows HR-TEM images of platinum nickel alloy catalysts supported on CNC ($Pt_2Ni_1$/CNC) obtained by a $NaBH_4$ reduction process followed by heat treatment at 900° C. (Comparative Example 3), a conventional precursor deposition process followed by heat treatment at 900° C. (Comparative Example 1), and by a precursor deposition process using polydopamine (PDA) as a capping agent followed by heat treatment at 900° C. (Example 1).

Portion (a) is a TEM image of the platinum nickel alloy catalyst supported on CNC ($Pt_2Ni_1$/CNC) obtained by a precursor deposition process using polydopamine (PDA) as a capping agent followed by a precursor deposition and heat treatment at 900° C. according to Example 1. Portion (b) is a TEM image of the platinum nickel alloy catalyst supported on CNC ($Pt_2Ni_1$/CNC) obtained by a conventional precursor deposition process followed by heat treatment at 900° C. according to Comparative Example 1, and portion (c) is a TEM image of the platinum nickel alloy catalyst supported on CNC ($Pt_2Ni_1$/CNC) obtained by a room-temperature $NaHB_4$ reduction process followed by heat treatment at 900° C. according to Comparative Example 3.

As shown in portion (a), the platinum alloy catalyst using PDA as a capping agent has a small and uniform particles with a size of 4 nm, while portions (b) and (c) show a particle size increased significantly to 10 nm or more and poor dispersibility.

The above results suggest that PDA successfully inhibits the particle size growth even during high-temperature heat treatment according to the present disclosure.

Test Example 7

Figure 9:
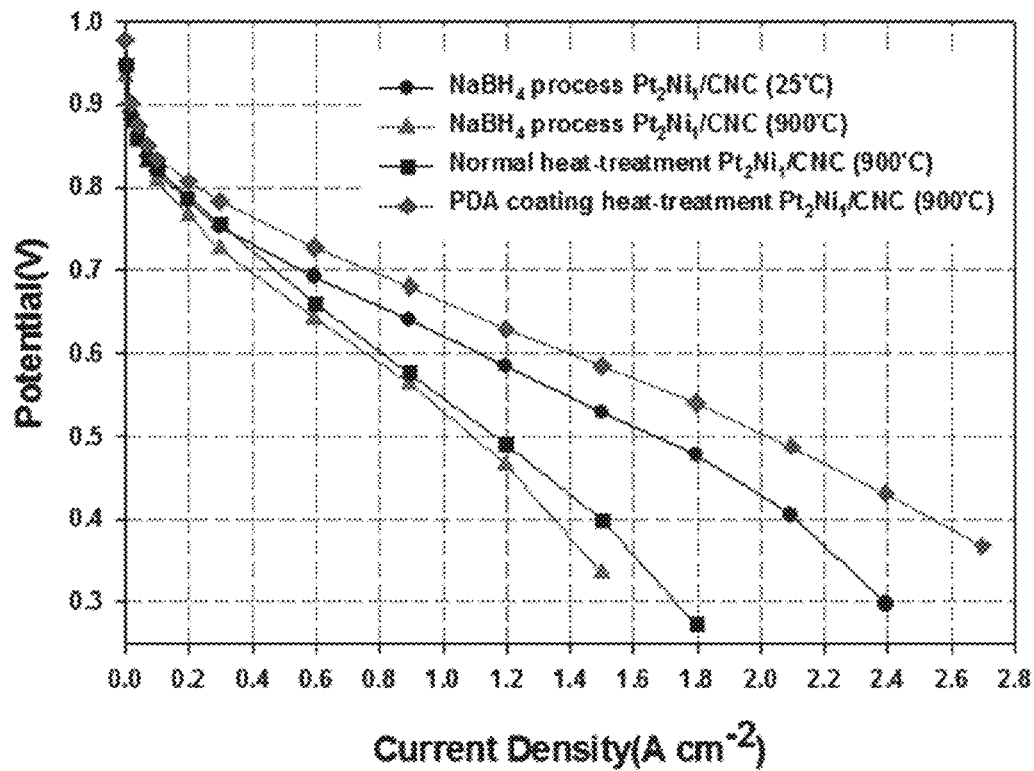
FIG. 9 shows the results of evaluation of oxygen performance of platinum nickel alloy catalysts supported on CNC ($Pt_2Ni_1$/CNC) obtained by a room-temperature $NaBH_4$ reduction process (Comparative Example 2), $NaBH_4$ reduction process followed by heat treatment at 900° C. (Comparative Example 3), a conventional precursor deposition process (Comparative Example 1), and by a precursor deposition process using polydopamine (PDA) as a capping agent followed by heat treatment at 900° C. (Example 1).

FIG. 9 shows the results of evaluation of oxygen performance of platinum nickel alloy catalysts supported on CNC ($Pt_2Ni_1$/CNC) obtained by a room-temperature $NaBH_4$ reduction process (Comparative Example 2), $NaBH_4$ reduction process followed by heat treatment at 900° C. (Comparative Example 3), a conventional precursor deposition process (Comparative Example 1), and by a precursor deposition process using polydopamine (PDA) as a capping agent followed by heat treatment at 900° C. (Example 1).

An anode is obtained by using 0.1 mg/$cm^2$ of a commercially available Pt/C catalyst based on Pt, and a cathode is obtained by using 0.1 mg/cm² of each catalyst based on metal. Each unit cell is operated while supplying 150 ccm of hydrogen to the anode and 150 ccm of oxygen to the cathode under ambient pressure.

In the case of $Pt_2Ni_1$/CNC using PDA as a capping agent, current density is 1.39 A/cm² at 0.6V. In addition, $Pt_2Ni_1$/CNC obtained by a room-temperature $NaBH_4$ reduction process shows a current density of 1.11 A/cm² at 0.6V. Further, $Pt_2Ni_1$/CNC obtained by a room temperature $NaBH_4$ reduction, followed by heat treatment at 900° C. shows a current density of 0.75 A/cm² at 0.6V, and $Pt_2Ni_1$/CNC obtained by a conventional precursor deposition process shows a current density of 0.80 A/cm² at 0.6V.

The above results conform to the tendency of particle size and alloying degree. Since $Pt_2Ni_1$/CNC using PDA as a capping agent maintains a small particle size even during high-temperature heat treatment and provides a high alloying degree, it is possible to obtain high catalytic activity.

Figure 10:
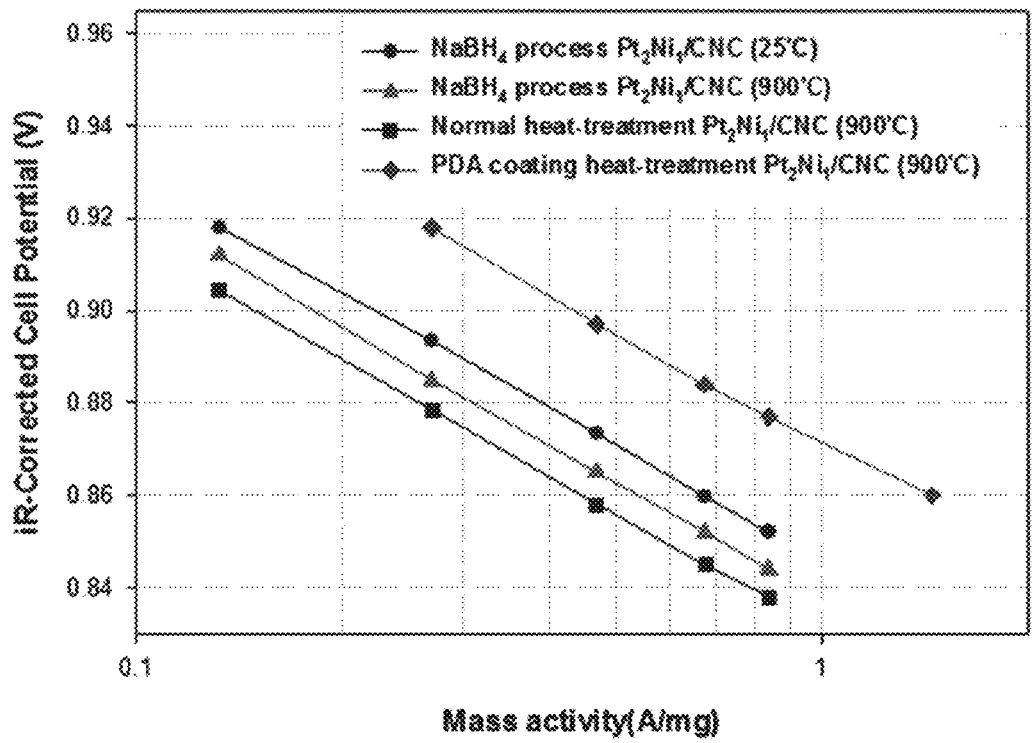
FIG. 10 shows the results of determination of mass activities of platinum nickel alloy catalysts supported on CNC ($Pt_2Ni_1$/CNC) obtained by a room-temperature $NaBH_4$ reduction process (Comparative Example 2), $NaBH_4$ reduction process followed by heat treatment at 900° C. (Comparative Example 3), a conventional precursor deposition process (Comparative Example 1), and by a precursor deposition process using polydopamine (PDA) as a capping agent followed by heat treatment at 900° C. (Example 1).

In addition, FIG. 10 shows the results of determination of mass activities of platinum nickel alloy catalysts supported on CNC ($Pt_2Ni_1$/CNC) obtained by a room-temperature $NaBH_4$ reduction process (Comparative Example 2), $NaBH_4$ reduction process followed by heat treatment at 900° C. (Comparative Example 3), a conventional precursor deposition process (Comparative Example 1), and by a precursor deposition process using polydopamine (PDA) as a capping agent followed by heat treatment at 900° C. (Example 1).

In the case of $Pt_2Ni_1$/CNC using PDA as a capping agent, mass activity is 0.43 A/mg at 0.9V. In addition, $Pt_2Ni_1$/CNC obtained by a room-temperature $NaBH_4$ reduction process shows a mass activity of 0.22 A/mg. Further, $Pt_2Ni_1$/CNC obtained by a room temperature $NaBH_4$ reduction, followed by heat treatment at 900° C. shows a mass activity of 0.18 A/mg, and $Pt_2Ni_1$/CNC obtained by a general precursor deposition process shows a mass activity of 0.15 A/mg.

The above results suggest that since the $Pt_2Ni_1$/CNC catalyst using PDA as a capping agent has a high alloying degree and small particle size, it is possible to obtain high catalytic activity.

Test Example 8

Figure 11:
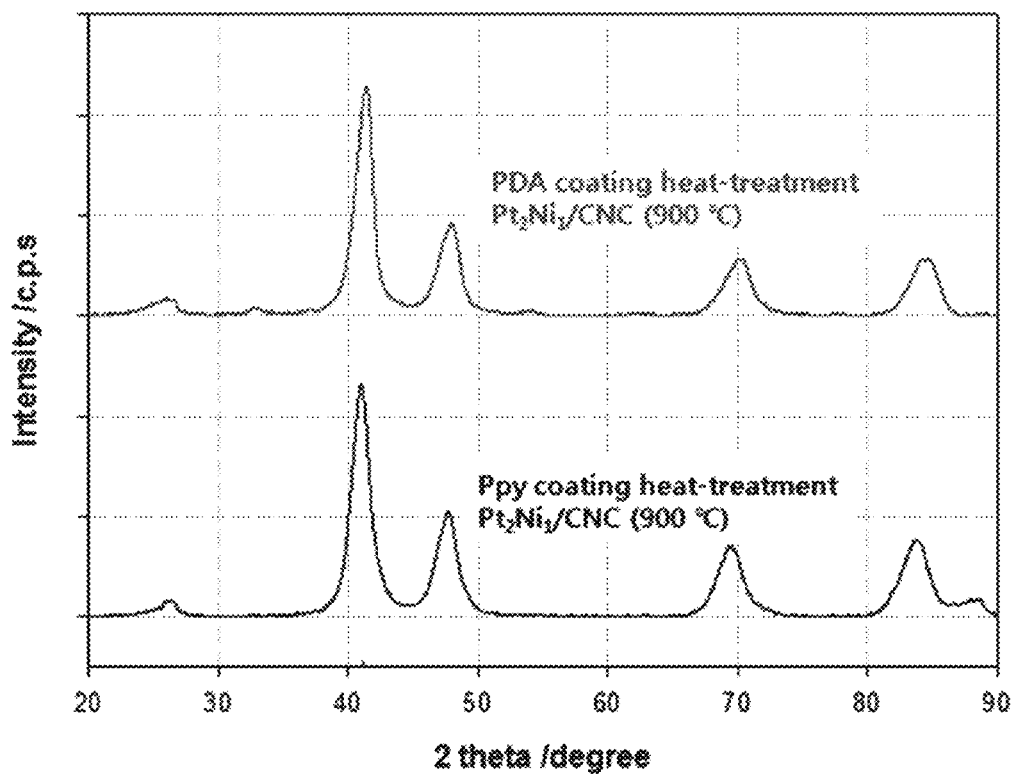
FIG. 11 shows XRD patterns of platinum nickel alloy catalysts supported on CNC ($Pt_2Ni_1$/CNC) obtained by a heat treatment process using polydopamine (PDA) for a platinum catalyst supported on carbon (Example 1) and by a heat treatment process using polypyrrole (PPy) (Comparative Example 4).

FIG. 11 shows XRD patterns of platinum nickel alloy catalysts supported on CNC ($Pt_2Ni_1$/CNC) obtained by a heat treatment process using polydopamine (PDA) for a platinum catalyst supported on carbon (Example 1) and by a heat treatment process using polypyrrole (PPy) (Comparative Example 4).

When preparing a catalyst by using polypyrrole (PPy) as a capping agent, the Pt/C catalyst is coated with polypyrrole and particle size growth can be inhibited during high-temperature heat treatment. However, as can be seen in Comparative Example 4, synthesis of polypyrrole (PPy) requires additional polymers and a low temperature condition of 4° C., and thus an additional refrigeration system is required, resulting in an increase in cost. Moreover, since PPy has poor adhesion, a large thickness of PPy coating is required to accomplish uniform coating on platinum particles and to inhibit particle size growth. Such a large thickness of PPy coating lowers the rate of diffusion of transition metals such as Ni into platinum, resulting in a decrease in alloying degree and an increase in proportion of transition metals on the surface. Therefore, in order to increase the alloying degree while maintaining a small particle size, a capping agent capable of inhibiting particle size growth while providing a smaller coating thickness as compared to PPy is required.

The PDA coating according to the present disclosure accomplishes self-polymerization under a weak alkaline condition at room temperature without any additional reducing agent, and thus requires no additional refrigeration system. In addition, PDA having high adhesive property allows uniform coating on Pt/C particles even in a smaller amount as compared to PPy. Further, in a precursor deposition process, PDA coating functions as sponge in which transition metals such as Ni are held.

By virtue of the above advantages, PDA efficiently inhibits the particle size increase of platinum alloy particles during high-temperature heat treatment, and such a small thickness of PDA coating facilitates diffusion of transition metals such as Ni into platinum particles. Thus, it is possible to increase the alloying degree as compared to the catalyst using PPy as a capping agent, and to obtain a catalyst provided with a core-shell structure having a Pt skin in which the proportion of Pt is high.

After carrying out XRD, ICP and XPS analysis for the platinum nickel alloy catalysts supported on CNC ($Pt_2Ni_1$/CNC) obtained by a heat treatment process using PDA (Example 1) and by a heat treatment process using PPy (Comparative Example 4), the alloying degree and particle size of each catalyst are calculated and the results are shown in the following Table 3.

TABLE 3

| Methods for preparing $Pt_2Ni_1$/CNC | (111) peak in XRD | | Particle size (nm) | ICP | | XPS atomic ratio (Pt:Ni) |
|---|---|---|---|---|---|---|
| | 2θ shift (°) Vs. Commercial Pt/C | | | Pt (wt %) | Ni (wt %) | atomic ratio (Pt:Ni) |
| Precursor deposition using PDA 900° C. heat treatment Ex. 1 | 1.34 | | 4.2 | 43.4 | 6.4 | 1.96 | 2.84 |
| Precursor deposition using PPy 900° C. heat treatment Comp. Ex. 4 | 1.20 | | 4.3 | 43.9 | 6.3 | 2.01 | 2.49 |

As can be seen from the ICP results, the catalysts obtained by a precursor deposition process using each of Ppy and PDA as a capping agent satisfy an impregnation ratio of 50 wt % and an atomic ratio of Pt:Ni=2:1.

Referring to the particle size calculated from XRD, the $Pt_2Ni_1$/CNC catalysts using each of PPy and PDA as a capping agent have a particle size of 4.3 nm and 4.3 nm, respectively. This suggests that both PPy and PDA successfully inhibit particle size growth as a capping agent despite the heat treatment at 900° C. However, in the case of a precursor deposition process using PPy as a capping agent, the alloy catalyst shows an alloying degree corresponding to a 2θ (shift toward the right side) of 1.20°, while the process using PDA as a capping agent provides an alloying degree corresponding to a 2θ (shift toward the right side) of 1.34°.

The above results suggest that use of PDA as a capping agent realizes a higher alloying degree by virtue of thinner and more uniform coating. Therefore, it can be seen that the precursor deposition process using PDA as a capping agent is more suitable for preparing an alloy catalyst having an increased alloying degree while maintaining a small particle size.

In addition, XPS analysis is carried out to determine the structure of a platinum alloy catalyst supported on carbon. As a result, the precursor deposition process using PPy as a capping agent provides a ratio of Pt:Ni of 2.49 and the precursor deposition process using PDA as a capping agent provides a ratio of Pt:Ni of 2.84.

The above results demonstrate that use of PDA as a capping agent provides an alloy catalyst having a higher proportion of platinum on the surface and particles with a core-shell structure. A fuel cell shows degradation of performance when the transition metals present on the surface of an alloy catalyst are dissolved out. Thus, a lower proportion of transition metals on the surface are advisable in terms of durability. Therefore, the precursor deposition process using PDA as a capping agent and thus providing a higher proportion of platinum on the surface and a core-shell structure is better than the same method using PPy as a capping agent, in terms of the durability of a fuel cell.

Test Example 10

Figure 12:
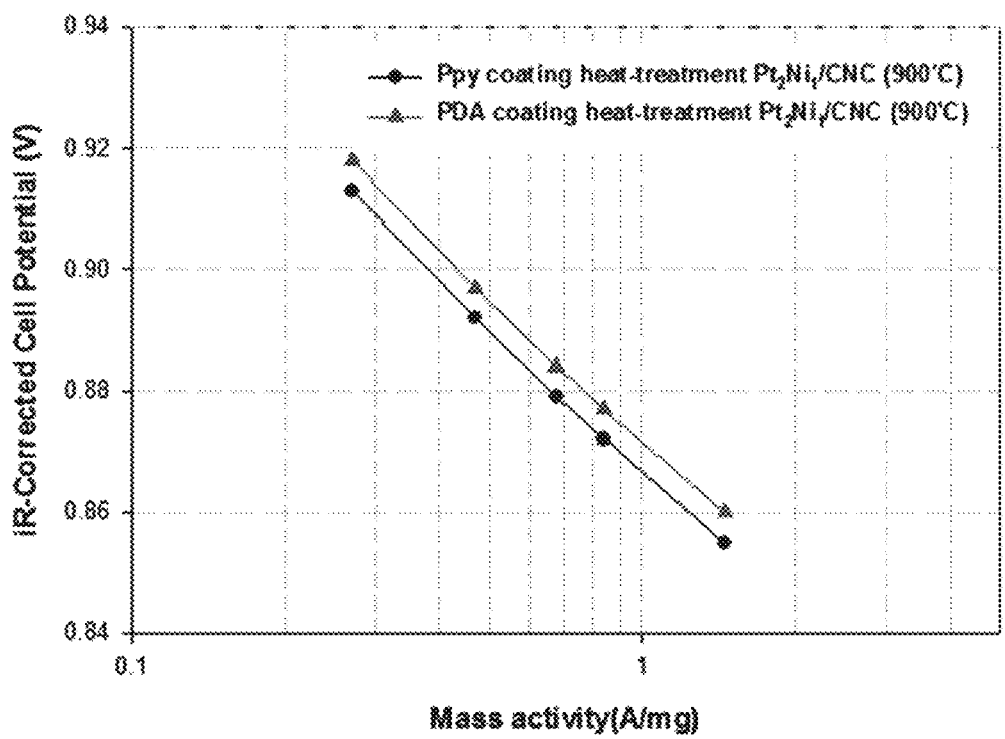
FIG. 12 shows graphs of mass activities of platinum nickel alloy catalysts supported on CNC ($Pt_2Ni_1$/CNC) obtained by a heat treatment process using PDA for a platinum catalyst supported on CNC and by a heat treatment process using PPy.

FIG. 12 shows graphs of mass activities of platinum nickel alloy catalysts supported on CNC ($Pt_2Ni_1$/CNC) obtained by a heat treatment process using PDA for a platinum catalyst supported on CNC and by a heat treatment process using PPy.

In the case of $Pt_2Ni_1$/CNC using PDA as a capping agent, mass activity is 0.43 A/mg. In addition, $Pt_2Ni_1$/CNC using PPy as a capping agent shows a mass activity of 0.38 A/mg. It is thought that the above results are derived from the fact that $Pt_2Ni_1$/CNC using PDA as a capping agent has a higher alloying degree. Therefore, the above results suggest that since $Pt_2Ni_1$/CNC using PDA as a capping agent has a higher alloying degree and higher catalytic activity as compared to $Pt_2Ni_1$/CNC using PPy as a capping agent, PDA is better than PPy as a capping agent.

What is claimed is:

1. A method for preparing an alloy catalyst supported on carbon, comprising a step of coating the surface of a platinum catalyst supported on carbon with polydopamine.

2. The method for preparing an alloy catalyst supported on carbon according to claim 1, which further comprises:
    allowing the polydopamine-coated platinum catalyst supported on carbon to be impregnated with a transition metal salt; and
    heat treating the transition metal salt-impregnated polydopamine-coated platinum catalyst supported on carbon.

3. The method for preparing an alloy catalyst supported on carbon according to claim 1, wherein the carbon is at least one selected from the group consisting of carbon black, carbon nanotubes, carbon nanofibers, carbon nanocoils and carbon nanocages.

4. The method for preparing an alloy catalyst supported on carbon according to claim 2, wherein the transition metal salt is at least one selected from the group consisting of nitrates, sulfates, acetates, chlorides and oxides containing gold, silver, cobalt, iron, nickel, palladium, ruthenium, titanium, vanadium or chrome.

5. The method for preparing an alloy catalyst supported on carbon according to claim 2, wherein the heat treatment is carried out at 700-1000° C.

6. The method for preparing an alloy catalyst supported on carbon according to claim 1, wherein the polydopamine is coated with a thickness of 0.5-5.0 nm.

7. A method for preparing an alloy catalyst supported on carbon, comprising a step of coating the surface of a platinum-transition metal catalyst supported on carbon with polydopamine.

8. The method for preparing an alloy catalyst supported on carbon according to claim 7, which further comprises:
    allowing the polydopamine-coated platinum-transition metal catalyst supported on carbon to be impregnated with a transition metal salt; and
    heat treating the transition metal salt-impregnated polydopamine-coated platinum-transition metal catalyst supported on carbon.

9. The method for preparing an alloy catalyst supported on carbon according to claim 7, wherein the carbon is at least one selected from the group consisting of carbon black, carbon nanotubes, carbon nanofibers, carbon nanocoils and carbon nanocages, and
    the platinum-transition metal comprises platinum and at least one selected from the group consisting of gold, silver, cobalt, iron, nickel, palladium, ruthenium, titanium, vanadium and chrome.

10. The method for preparing an alloy catalyst supported on carbon according to claim 8, wherein the transition metal salt is at least one selected from the group consisting of nitrates, sulfates, acetates, chlorides and oxides containing gold, silver, cobalt, iron, nickel, palladium, ruthenium, titanium, vanadium or chrome.

11. The method for preparing an alloy catalyst supported on carbon according to claim 8, wherein the heat treatment is carried out at 700-1000° C.

12. The method for preparing an alloy catalyst supported on carbon according to claim 7, wherein the polydopamine is coated with a thickness of 0.5-5.0 nm.

13. An alloy catalyst supported on carbon obtained by the method as defined in claim 1, which is provided with a core-shell structure having a surface layer comprising platinum and a core comprising platinum and the transition metal.

14. An alloy catalyst supported on carbon obtained by the method as defined in claim 7, which is provided with a core-shell structure having a surface layer comprising platinum and a core comprising platinum and the transition metal.

15. An electrode for fuel cells comprising the alloy catalyst supported on carbon as defined in claim 13.

16. An electrode for fuel cells comprising the alloy catalyst supported on carbon as defined in claim 14.

17. A fuel cell comprising the electrode as defined in claim 15.

18. A fuel cell comprising the electrode as defined in claim 16.

* * * * *